United States Patent
Sharma et al.

(10) Patent No.: US 12,058,606 B2
(45) Date of Patent: *Aug. 6, 2024

(54) WIRELESS TELECOMMUNICATIONS APPARATUSES AND METHODS

(71) Applicant: Sony Group Corporation, Tokyo (JP)

(72) Inventors: Vivek Sharma, Basingstoke (GB); Brian Alexander Martin, Basingstoke (GB); Yuxin Wei, Basingstoke (GB); Hideji Wakabayashi, Basingstoke (GB); Shinichiro Tsuda, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 414 days.

This patent is subject to a terminal disclaimer.

(21) Appl. No.: 17/359,643

(22) Filed: Jun. 28, 2021

(65) Prior Publication Data

US 2021/0329538 A1 Oct. 21, 2021

Related U.S. Application Data

(63) Continuation of application No. 16/344,805, filed as application No. PCT/EP2017/075068 on Oct. 3, 2017, now Pat. No. 11,051,235.

(30) Foreign Application Priority Data

Nov. 3, 2016 (EP) .................................. 16197185

(51) Int. Cl.
*H04W 48/12* (2009.01)
*H04W 36/22* (2009.01)
(Continued)

(52) U.S. Cl.
CPC ........... *H04W 48/12* (2013.01); *H04W 36/22* (2013.01); *H04W 48/06* (2013.01); *H04W 76/18* (2018.02)

(58) Field of Classification Search
None
See application file for complete search history.

(56) References Cited

U.S. PATENT DOCUMENTS 7,899,441 B2 3/2011 Zhang
10,694,404 B2 6/2020 Chandramouli et al.
(Continued)

FOREIGN PATENT DOCUMENTS

JP 2005269109 A 9/2005
JP 2013536636 A 9/2013
(Continued)

OTHER PUBLICATIONS

Sharp, R2-166353, "NR System Information Areas for Other SI," 3GPP TSG RAN WG2 #95bis, 3GPP Server (Sep. 30, 2016).
(Continued)

*Primary Examiner* — Minh Trang T Nguyen
(74) *Attorney, Agent, or Firm* — XSENSUS LLP (57) ABSTRACT

A method of transmitting system information in a mobile communications network, the network comprising a base station operable to provide a cell to communicate wirelessly with a plurality of mobile terminals and a mobile terminal of the plurality of mobile terminals, the mobile terminal being operable to communicate with the base station. The method comprises periodically transmitting essential system information "ESI" to the plurality of mobile terminals, the ESI comprising system information for using the cell provided by the base station; transmitting additional system information "ASI" to the mobile terminal, the ASI comprising system information for using one or more services provided
(Continued)

by the cell. In the event that it is determined that the base station is overloaded, the method further comprises transmitting a service notification that the cell is currently unable to provide the one or more services.

19 Claims, 4 Drawing Sheets

(51) Int. Cl.
  *H04W 48/06* (2009.01)
  *H04W 76/18* (2018.01)

(56) References Cited

U.S. PATENT DOCUMENTS

| | | | |
|---|---|---|---|
| 2005/0185917 | A1 | 8/2005 | Andrzej et al. |
| 2008/0214186 | A1 | 9/2008 | Bizzarri et al. |
| 2008/0235701 | A1 | 9/2008 | Danko |
| 2010/0077088 | A1 | 3/2010 | Hyun et al. |
| 2010/0274893 | A1 | 10/2010 | Abdelal et al. |
| 2012/0058742 | A1 | 3/2012 | Razoumov et al. |
| 2012/0092492 | A1 | 4/2012 | Carbonell et al. |
| 2013/0086194 | A1 | 4/2013 | Estes et al. |
| 2014/0056134 | A1 | 2/2014 | Koskinen et al. |
| 2014/0269275 | A1 | 9/2014 | Jun et al. |
| 2014/0295791 | A1 | 10/2014 | Cai et al. |
| 2015/0100629 | A1 | 4/2015 | Bae |
| 2015/0289312 | A1 | 10/2015 | Ranta et al. |
| 2015/0312352 | A1 | 10/2015 | Shamilian et al. |
| 2016/0219625 | A1* | 7/2016 | Lee ................ H04W 4/029 |
| 2017/0111406 | A1 | 4/2017 | Ionescu |
| 2018/0013524 | A1 | 1/2018 | Chien et al. |
| 2018/0092085 | A1 | 3/2018 | Shaheen et al. |
| 2018/0103418 | A1 | 4/2018 | Aghili et al. |
| 2019/0306661 | A1 | 10/2019 | Deluca et al. |
| 2020/0146075 | A1 | 5/2020 | Agiwal et al. |

FOREIGN PATENT DOCUMENTS

| | | |
|---|---|---|
| JP | 2013255061 A | 12/2013 |
| JP | 2014522199 A | 8/2014 |
| WO | 2013/102801 A1 | 7/2013 |
| WO | WO-2016003140 A1 | 1/2016 |
| WO | WO-2016114762 A1 | 7/2016 |
| WO | WO-2016130353 A2 | 8/2016 |

OTHER PUBLICATIONS

International Search Report and Written Opinion mailed on Nov. 24, 2017 for PCT/EP2017/075068 filed on Oct. 3, 2017, 17 pages.
Intel Corporation, "System information for standalone NR deployment", 3GPP TSG-RAN WG2 Meeting No. 95bis R2-166885, Kaohsiung, Oct. 10-14, 2016, pp. 1-5.
Holma et al., "LTE for UMTS", OFDMA and SC-FDMA Based Radio Access, System Architecture based on 3GPP SAE, 2009, 11 pages.
ACBOP, "Update for "potential technical solutions" in section 6 of TR 23.898", 3GPP TSG-SA WG2 Meeting No. 41 Tdoc S2-042910, Montreal, Canada, Aug. 16-20, 2004, pp. 1-9.
Sharp, "Latency and Overload Issues for MTC Devices", 3GPP TSG-RAN WG2#71 R2-104348 Madrid, Spain, Aug. 23-27, 2010, pp. 1-3.
Huawei et al., Delivery of "Other SI" in NR, 3GPP TSG-RAN2 Meeting No. 95bis R2-166203, Kaohsiung Oct. 10-14, 2016, 5 pages.
Nokia et al., "Distribution of System Information in NR", 3GPP TSG-RAN WG2 Meeting No. 95bis R2-167039 Kaohsiung, Taiwan, Oct. 10-14, 2016, 5 pages.
Office Action issued Mar. 4, 2020 in European Patent Application No. 17 778 272.9, 12 pages.

* cited by examiner

FIG. 1

Background Art

FIG. 2

Background Art

FIG. 3

Background Art

FIG. 4

WIRELESS TELECOMMUNICATIONS APPARATUSES AND METHODS

CROSS-REFERENCE TO RELATED APPLICATIONS

The present application is a continuation of U.S. application Ser. No. 16/344,805, filed Apr. 25, 2019, which is based on PCT filing PCT/EP2017/075068, filed Oct. 3, 2017, which claims priority to EP 16197185.8, filed Nov. 3, 2016, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance. A single device type might also be associated with different traffic profiles depending on the applications it is running. For example, different consideration may apply for efficiently supporting data exchange with a smartphone when it is running a video streaming application (high downlink data) as compared to when it is running an Internet browsing application (sporadic uplink and downlink data).

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

For a wireless telecommunications system to efficiently support terminal devices of different types having different capabilities and communicating different types of data, the network infrastructure needs to know the relevant characteristics of the terminal devices' operation—i.e. the characteristics which may impact how communications with the terminal device should be handled to improve efficiency. In this regard the relevant characteristics of a terminal device's operation may be broadly considered to fall into two categories of information.

A first category, which may be referred to herein as capability information, includes information which relates to the fundamental ability of the terminal device to access the radio network, for example in terms of the radio access technologies it supports, its operating bandwidth and frequencies, MIMO support, carrier aggregation support, and so on. Capability information may thus broadly be considered to relate to characteristics of the device which are generally set by hardware and which determine how the terminal device can access the physical layer. The use of such capability information in configuring communications in wireless telecommunications systems is well established.

A second category of information, which may be referred to herein as application information or device context information, includes information which relates to higher-layer operations of the terminal device (i.e. layers higher than the physical later), for example including information relating to software applications the device supports/is currently running, and the nature of the device and how it is being used, for example in terms of whether the device is a static device, a mobile device, a wearable device, and so on. Application information/device context information may thus be considered to include information representing parameters/characteristics that relate to a current mode of operation for a mobile device, its environment and mobility, and other information which is separate from the capability information relating to how the terminal device may physically access the radio interface.

In conventional wireless telecommunications networks, such as LTE-based networks, it is known for a base station to transmit system information such that terminals can access and use the cell that it provides. With a number of new services having been introduced in the latest releases of standards, it has been proposed that the base station would also transmit, on demand, additional system information regarding the services provided in the cell. However, in an LTE environment, in a case when the base station/cell has already a high load, it may not be able to provide the same level of services and current proposals for assisting an overloaded base station are only of limited use.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
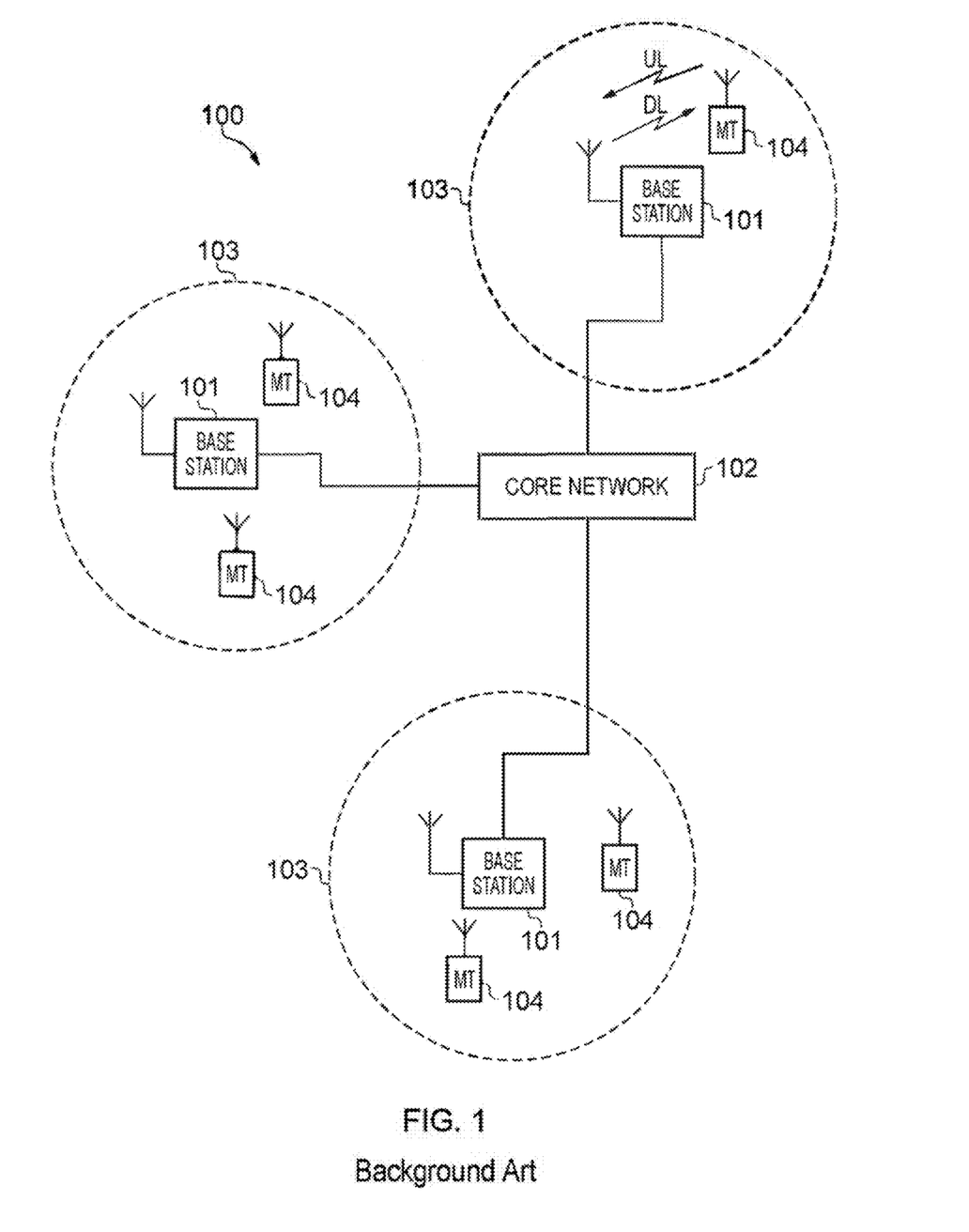
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles but which may also support other radio access technologies and which may implement embodiments of the disclosure as described herein. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards and previously proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
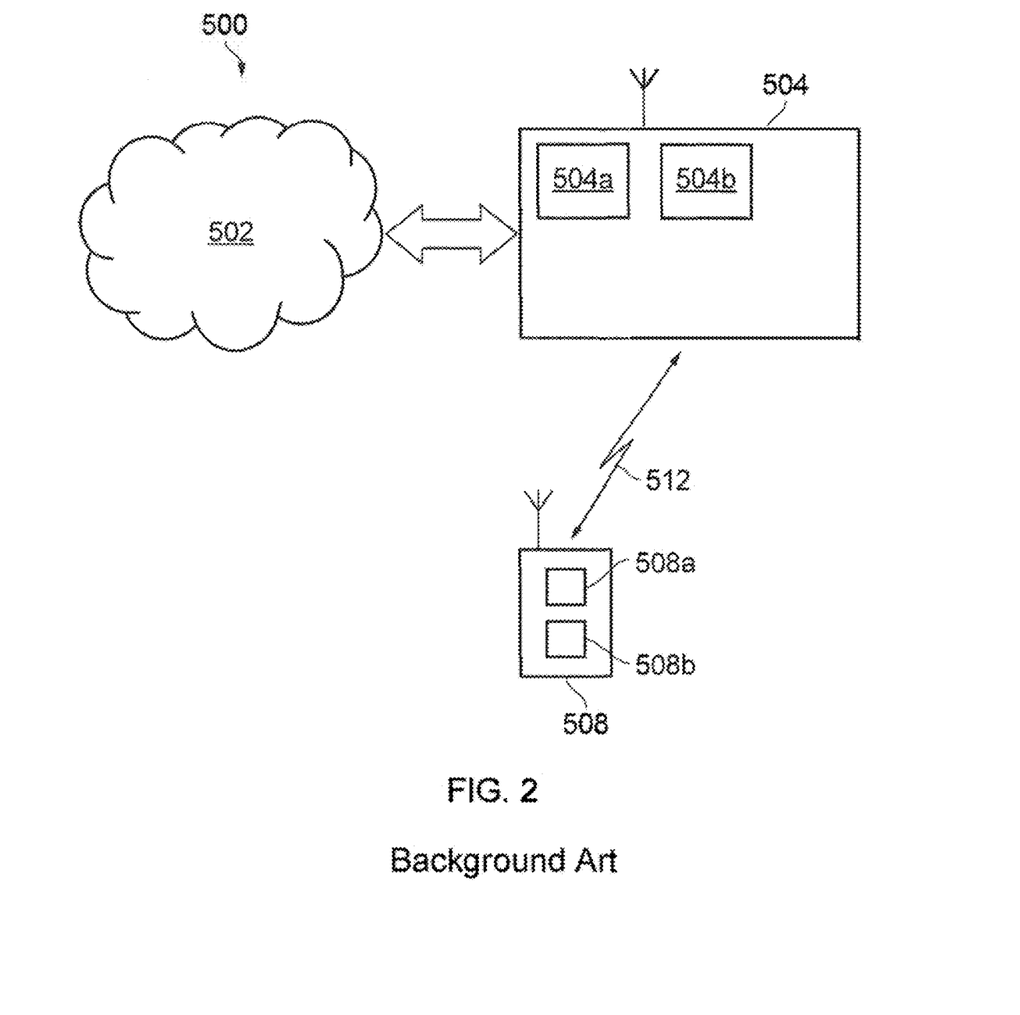
FIG. 2 schematically represents some aspects of a wireless telecommunications network configured to operate in accordance with certain embodiments of the present disclosure.

FIG. 2 schematically shows some further details of a telecommunications system 500 according to an embodiment of the present disclosure. The telecommunications system 500 in this example is based broadly around an LTE-type architecture and the telecommunications system may also support other radio access technologies, either using the same hardware as represented in FIG. 2 with appropriately configured functionality or separate hardware configured to operate in association with the hardware represented in FIG. 2. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. In this example, only one base station 504 and one terminal device 508 are represented in FIG. 2. However, it will of course be appreciated that in practice the radio network part will typically comprise a plurality of base stations serving a larger number of terminal devices across various communication cells, as well as potentially including transceiver stations supporting radio communications with terminal devices on cells operating in accordance with other radio access technologies, such as UTRAN, GERAN, WLAN or a 5G new RAT. However, only a single base station and terminal device are shown in FIG. 2 in the interests of simplicity.

The terminal device 508 is arranged to communicate data to and from the base station (transceiver station) 504. The base station is in turn communicatively connected to a serving gateway, S-GW, (not shown) in the core network part which is arranged to perform routing and management of mobile communications services to the terminal device in the telecommunications system 500 via the base station 504. In order to maintain mobility management and connectivity, the core network part 502 also includes a mobility management entity, MME, (not shown) which manages the enhanced packet service, EPS, connections with the terminal device 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 2 may be conventional apart from where modified to provide functionality in accordance with embodiments of the present disclosure as discussed herein. It will be appreciated embodiments of the invention may in general be implemented in wireless communications systems operating in accordance with different radio access technologies, for example, who one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 508 is adapted to support operations in accordance with embodiments of the present disclosure when communicating with the base station 504 as discussed further herein. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508a are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 2 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 2 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 2 for simplicity, the processor circuitry 504b may comprise scheduling circuitry, that is to say the processor circuitry 504b may be configured/programmed to provide the scheduling function for the base station 504.

In current developments, there has been proposals made for the base station to transmit, in additional to the essential system information (that terminals have to obtain before they can use the cell provided by the base station), "other system information" or "other SI" for providing information to terminals about additional services that may be available in the cell. While the essential SI ("ESI" herein) is always transmitted when the cell is campable, the other SI is only transmitted when required, that is on demand from terminals. Other SI will also be referred to herein as "additional SI" or "ASI" for brevity. In this context, at the RAN2#95bis meeting the following three objectives have been agreed:
1: For on demand SI, other SIs may be broadcasted at configurable periodicity (equivalent to SI period in LTE) and for a certain duration.
2: Request of the other SI by idle and "new state" UE should be performed without state transition.
3: For an SI required by the UE, the UE should know whether it is available in the cell and whether it is broadcast or not before it sends the other SI request (e.g. by checking minimum SI).

The agreements above are for allowing ASI to be sent on-demand following a request from a UE. Before sending the request, UE should know whether a certain SIB is available in the cell. Based on these agreements and discussions, one scheme proposed is that of R2-166203, as illustrated with respect to FIG. 3.

Figure 3:
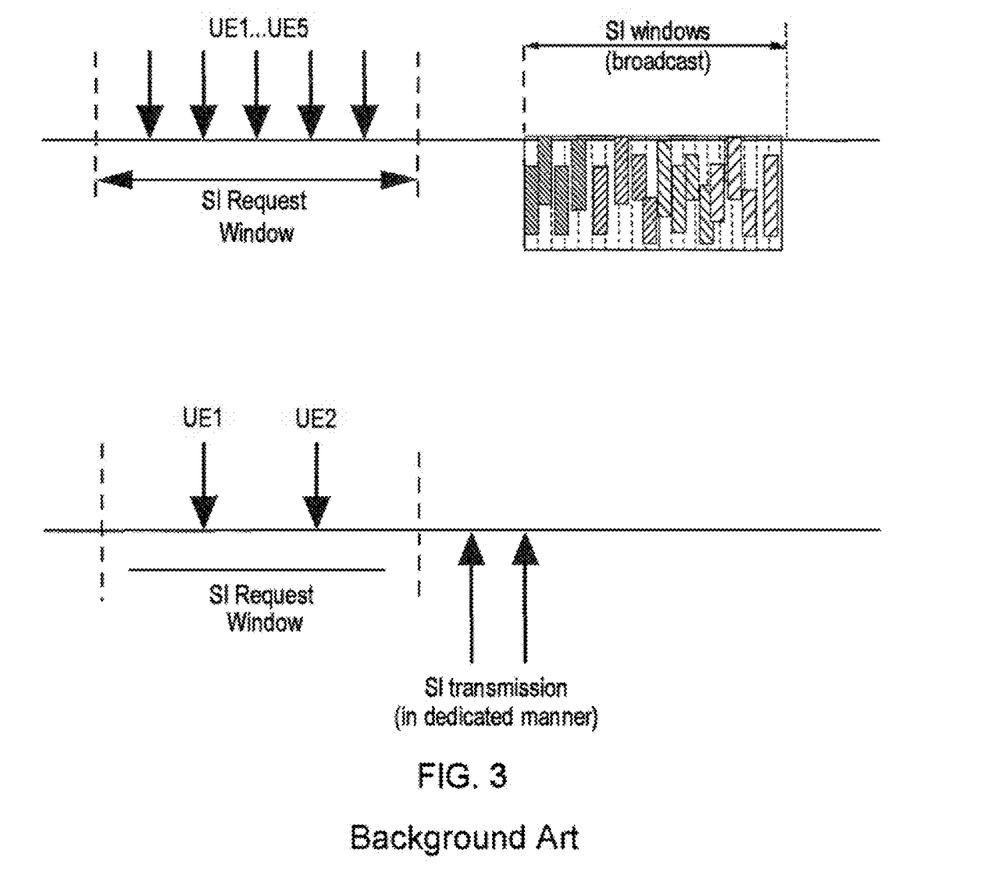
FIG. 3 schematically represents some aspects of a wireless telecommunications network configured to transmit system information to terminals.

In the scheme illustrated in FIG. 3, a UE can send a request for ASI wherein the request has to be send within SI request window. The network can then decides to deliver the SI either via broadcast or dedicated signalling as shown in the two alternatives of FIG. 3. Accordingly the ASI is then simply delivered to terminal upon request.

With a view to achieving agreement #2 above, using Random Access "RA" preamble for the request appears the most likely option for determining a way of requesting the SI. The UE can then wait for a configurable period of time, namely the SI response window, to send the RA preamble.

Finally, when looking at the agreement #3, this allows the UE to send a request (e.g. a RA preamble) after checking the essential SI which should include information about other SI scheduling. Some companies proposed to use a bitmap for availability of each SI transmitted as "Other SI". For example the ESI could indicate that ASI is available for a first service but is not available for a second service.

However, if network is overloaded or congested, then the transmission of ASI may have the effect of further increasing the load of the base station which would be unfortunate. One solution could be to decide that network reserves enough resources in advance (like LTE) for system information broadcast. This has been proposed in R2-166885 where it is suggested that "When system load is high, it is preferred to switch back to always-broadcast delivery, without allowing UE to request other SI".

While this would reduce the signaling overhead, this proposal remains unsatisfactory as the system is more likely to be overloaded in the downlink, rather than in the uplink. Therefore the savings made with this solution, in uplink resources for requesting the ASI, would most likely only have a limited impact on reducing the load of the base station. For example, there may be only a single signature (or a single signature per SIB type) from RA preamble resources being used to request the ASI and RA resources will always be transmitted even during the overload (UEs shall be able to perform RA procedure as usual even when the cell is overloaded). As a result, a UE can still request the ASI when the base station is overloaded and such requests are not resource consuming.

On the other hand, switching back to always-broadcast delivery as proposed will result in the network reserving SI resources in advance and therefore increasing the load of the cell. Also, the overheads due to beamforming also need to be considered such that the effect of this modification would be even stronger in 5G with beamforming than in LTE. Also, due to the overload, it may not be possible for network or cell to serve these UEs anyway. Another aspect to consider is that UE will request other system information ("ASI") only if it is interested in starting to use the corresponding service. For example, the UE will only request MBMS SIBs if it is actually interested in using MBMS services.

Below is a list of system information currently available in LTE excluding cell reselection SIBs 3, 4, 5, 6, 7 which could be part of "Other SI":

| LTE SIB | Purpose | Relevance to NR and on-demand SI (Other SI) |
|---|---|---|
| SIB 8 | CDMA2000 interworking | Not required |
| SIB 9 | HNB name | May be relevant for NR |
| SIB 10, 11, 12 | PWS (ETWS and CMAS) | NR shall broadcast PWS information and currently considered as part of other SI |
| SIB 13, 15 | MBMS | MBMS is phase 2 and these SIBs are also used for SC-PTM. SC-PTM may be used for MTC devices |
| SIB 16 | UTC time | |
| SIB 17 | Interworking with WLAN | NR RAT should interwork with WLAN so NR cell should broadcast if supported |
| SIB 18, 19 | D2D | Phase 2 but can be broadcast |
| SIB 20 | SC-PTM | See SIB 13, 15 |

The assumption taken here is that cell reselection parameters are included in Essential SI such that terminals can use the cell or camp on the cell even if no further system information ("SI") is provided and perform basic mobility. If cell reselection parameters are also included in ASI (as it has been suggested by some), then any action under network overload becomes a high priority for the networks as UE may otherwise not be able to reselect another cell if the ASI is not provided when the base station is in system overload mode.

It is therefore desirable to find an arrangement which can deal with the transmission of ASI and that is able to do so even when the base station is overloaded.

According to the present invention, when the base station, there is provided an arrangement where, if the base station is overloaded, the terminal may be sent an indication, e.g. as part of the ESI or ASI, that the cell is not able to provide the one or more services for which the ASI was requested.

Whereas before the terminal would have to request the ASI and, upon receipt of the ASI, would try to access the corresponding (which would have been unsuccessful as the cell is overloaded already, the terminal can now receive an indication that the services are not provided. This can enable a reduction in signaling in the network.

Viewed from a perspective, there are two levels of solutions proposed in this disclosure. First, the disclosure is considering the aspect that the size of "other SIBs or on-demand SIBs" itself is considerable enough and that the network may be unable to accommodate the transmission of these SIBs. Secondly, there may be enough resources to transmit these SIBs but not enough to accommodate the UEs requesting the associated service. It may not always be true that new UEs will request new resources as MBMS (broadcast in the cell) and D2D resources (reserved resources in a cell) could consume fixed resources from a cell point of view. But both can be provided as unicast as well based on network decision.

Taking into accounts the proposals made herein and discussed below, the present disclosure can for example propose four example implementations:

1. In one example the network can provide the ASI to the terminal but it does not have enough resources to accommodate new UE requests for features in "Other SI" like e.g. D2D/MBMS via dedicated signalling. It is assumed that essential SI does not include scheduling/availability information for these SIBs. The base station can then broadcast, e.g. by broadcasting SIB2, that access to "Other SI" for this UE/group/all UEs is barred.

Accordingly, if the UE wants to access specifically this service, the UE does not send an ASI request and instead move to another cell/RAT. The network can provide assistance information to the terminal(s), for example cell/RAT in essential SI. In cases where cell reselection SIBs are also part of "Other SIB" then the network can set cell reselection SIBs and SIB 2 accordingly and transmit these. If however cell reselection SIBs are not included or not broadcasted then essential SIB can include such information SIB 2 (which may be used for including an indication of the service(s) being barred and the cell/RAT where UE requesting such service should go) may be broadcast to a selection of the UEs in a cell based on service or access class. This could be based on currently existing ACDC feature, whereby the network can broadcast barred ACDC categories and UE checks it against its ACDC category, or using a new mechanism as described here. If the large number of services (e.g. 100) or large number of group (e.g. 100) is operated in the mobile network, a large SIB is likely to be needed. In order to reduce the SIB size, it may be possible to broadcast the level of congestion (e.g. 1-3) in SIB2. UE can then decide to whether to avoid sending the SI request and move to another cell based on the current cell congestion level and pre-configured maximum allowed congestion level which should support the group of UE or the specific service (or slicing). For example, e.g. 4K video may not be allowed to use under the congestion level 3, but it may be is allowed to use congestion level 2 and voice may be allowed to under congestion level 3. The advantage of this scheme is that it is independent of access classes (UE not supporting access classes can also implement access barring) and ACDC categories.

Alternatively, UE may acquire the system information and use it in another cell as it is assumed cells will coordinate the cell load. For example, if the network implements an anchor cell technique, one cell may be configured to broadcast the ASI for one or more other cells.

2. In another example, the network can broadcast as part of scheduling information in the essential SI information that clearly states that the network will neither broadcast the Other SI SIBs nor send it via dedicated signalling and whether UE is permitted to start the corresponding service or not in the cell or associated cells.

For example, in one implementation, all bits related to SIBs included in the Other SI set to 0. The UE in Idle mode may assume no "Other SI" being broadcast and so will the UEs in RRC_Connected. UE moves to another cell/RAT if related service is to be started—otherwise the UE may wait to attempt to re-connect late. The network can provides assistance in cell reselection related SIBs. Some information is then sent to the UE indicating the parameters it shall use if it shall perform cell reselection and start service in another cell or wait in the same cell. This is to distinguish from a case where a cell does not support the feature. The case being addressed here is one where network supports the feature and current cell cannot honour the UE request and UE is permitted to use the feature in neighbouring cells. This may also involve broadcasting an indication that neighbour cells support the feature.

3. If the other cell is responsible to provide the other SI for this cell then the UE shall have such information either already or perform reselection and again reselect the same cell. Acquiring such information from the other cell may indicate to the UE that it is perfectly acceptable to start the corresponding service e.g. D2D or MBMS even though system is overloaded. This situation should be avoided. Therefore in this example, the cells coordinate an overload situation over an X2 like interface and neighbouring cells stop broadcasting the ASI ("Other SI") for this overloaded cell. Alternatively, if SIB2 is transmitted and states the cell is barred for all services (see example 1 above), it can also indicate that acquisition of ASI is not available either. It is noteworthy that it is conceivable that, in some examples, the cell barring may be for some but not all of the services. For example the cell may allow low capacity services or emergency services may bar the use of other services with a lower priority and/or requiring a higher available throughput to operate.

The UE can either move to another cell/RAT if the related service is to be started or camp on the same cell. If the camped on cell is overloaded then essential SI will preferably indicates so such that UE does not request "Other SI".

4. The network may switch the cell from being one of the cells where UE can camp on to the one where UE can no longer camp on i.e. stop transmission of PSS/SSS, PBCH, and/or essential SI. The UE already camped on such a cell may lose the cell and this applies to UEs in Idle and RRC_inactive state, if RRC_inactive is modelled as a substate of RRC_Idle. The network can thus inform such an action in advance via e.g. paging or essential SI with a view to reducing disruption to the terminals.

All of these implementations can be used with a terminal being in an Idle mode, RRC_Inactive or RRC_Connected mode.

Also, in one implementation and for example in combination with any of the examples discussed above, instead of the UE reselecting another cell/RAT, a back-off timer can be broadcasted by the cell. The UE can request the "Other SI" again after the expiry of this backoff timer but stays in the same cell, if transmitted. A randomization function, based on ACB mechanism, can be used in order to ensure that not all UEs attempt to access the SI after the backoff timer expiry. Some UEs can also decide to move to another cell/RAT straightaway while others will decide to use the timer and wait, as directed by the network. This can for example be decided based on the urgency or priority for the terminal to use the service. Also, a terminal may decide to try again only for a number of further attempts and/or for a limited period of time.

All embodiments above have considered on-demand SI, however, network load due to beam forming is also likely to have an impact if LTE based SIB transmission is used for NR/5G networks. LTE SIB transmission is always on with a fixed periodicity which is broadcasted in SIB1. However, due to beamforming of system information transmission, overheads are larger with NR/5G compared to LTE. With this in mind, a backoff timer/counter can still be broadcasted in SIB1/2. The UE can interpret this timer as the periodicity of a particular SIB, if UE does not find SI-RNTI (or relevant indicator indicating the presence of SIB) then it will assume that network did not broadcast the SIB at this occurrence of SIB and can use the timer or counter to ensure both network and UE are in synchronised regarding whether it is a case of SIB decode failure or a case of non-transmission of a SIB. It may also happen that subframe boundaries in NR will vary and network resources are already occupied at the exact moment of SIB transmission. For example, if SIB subframe is 1 msec and eMBB is 10 msec and URLLC is 0.1 msec then network resources may already have been occupied e.g. by eMBB and URLLC resources and there are not enough resources left for SIB transmission. When the counter approach is used then the UE may increment the counter when SIB is not found at its pre-defined/expected space and once the counter has reached the maximum broadcasted value, then network must transmit the related SIB at its next periodicity. Further modifications could be envisaged like resetting the timer/counter once SIB has been transmitted.

In an example, the network can set access to the cell as "barred" in SIB2 when the cell is overloaded. Cell barring is currently broadcasted in SIB2 and also includes an intra-frequency indicator IE indicating whether UEs are allowed to go to another cell on the same frequency when the cell is barred. Then, in the event that the ESI (e.g. SIB2) indicates the cell is barred then the UE shall not send ASI/"Other SI" request (for example in addition to the objective #3 mentioned above).

If SIBs are broadcasted like LTE (rather than being on-demand SIBs) then in LTE, SIB1 can provide scheduling information and SIB2 provides cell barring parameters in accordance with the present disclosure. The UE can ignore the scheduling information for other SIBs (or alternatively, the network does not broadcast scheduling info) and treat the cell as being barred. Additionally, 5G/NR networks may include cell barring parameters for example in SIB1 or scheduling information and cell barring parameters in the same SIB so that a UE does not unnecessarily store SIB scheduling information in the event that the cell is barred for accessing all services (or one or more services).

Figure 4:
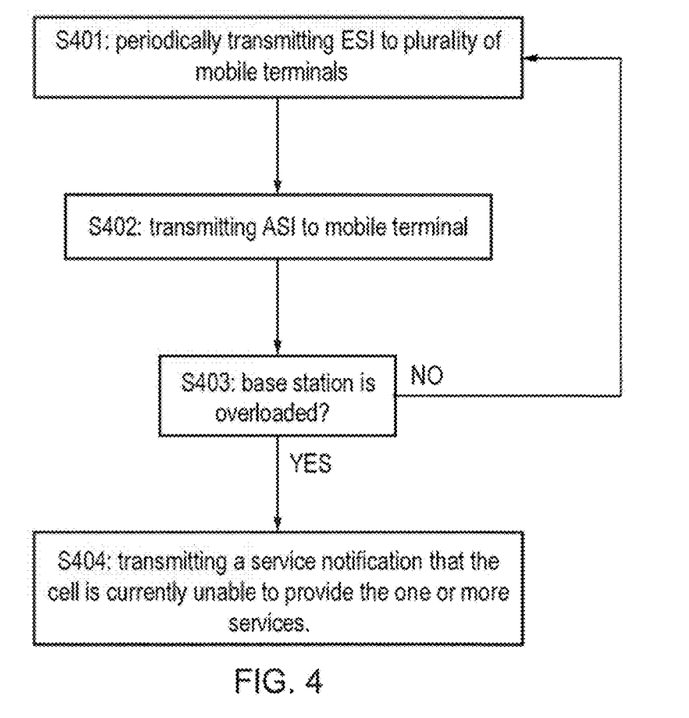
FIG. 4 schematically represents some aspects of method for use in a wireless telecommunications network.

FIG. 4 schematically represents some aspects of method for use in a wireless telecommunications network. In this example method, ESI is periodically transmitted to a plurality of mobile terminals (S401) wherein the ESI comprises information for terminals to be able to use the cell. In the example illustrated above, the ESI can for example comprise the MIB and/or SIB (e.g. SIB1, SIB2) which are used by terminals for using the cell to provide the terminal with an access to the mobile network (rather than a specific service). Then at S402, ASI is transmitted to mobile terminal. The ASI is on the other hand associated with one or more services provided by the cell and that the terminal may be able to use once it has already access to the cell. The ASI can be transmitted by the base station from which the use of the service is intended, or from another base station that may be able to coordinate communication and send the ASI to the terminal.

It is then determined at S403 if the load of the base station is above a threshold. If it is detected that the base station is overloaded then the method moves to S404 where a service notification that the cell is currently unable to provide the one or more services is transmitted to the terminal. It can be transmitted as part of the ESI (e.g. with all fields relating to the other SI set to "0", in which case the ASI may no longer be sent), as part of the ASI and may be transmitted in the cell in question or in a neighbouring cell that can serve the terminal. Accordingly, the terminal may be notified that the service it is trying to access is not available at this point in time, rather than obtain the ASI information but then not be able to actually use the service due to the overload of the base station.

According to the present disclosure, the network has additional flexibility when dealing with an overload situation and at the same time ensuring synchronization (in terms of decoding failure versus non-transmission) between a UE and a cell. In particular, where previously the terminal would always receive the ASI, would attempt to use the service (if provided by the cell) and only then would be able to determine whether the base station is actually able to provide the service to the terminal, the network can deal with overload situation more efficiently in accordance with the teachings of the present disclosure.

Even though UMTS and GERAN RATs are not supported in the new architecture, the skilled person will appreciate that cell reselection may still happen between NR/5G and these RATs.

The same comment applies to SIB8 (CDMA2000). These discussions may impact the size of cell reselection SIs but the skilled person will be able to apply the teachings provided above to these cases.

NR/5G cells with beamforming will have small coverage area and not many UEs will request the additional SI such that network resources may be dimensioned accordingly. For example, the network may allocate more resources for data transmission compared to common channel transmissions if a low level of ASI transmission is expected. Also and as mentioned above, beamforming as used in NR/5G will increase the overheads for transmission of SI.

Therefore, in accordance with the present disclosure, there has been provided a method of transmitting system information in a mobile communications network, the network comprising a base station operable to provide a cell to communicate wirelessly with a plurality of mobile terminals and a mobile terminal of the plurality of mobile terminals, the mobile terminal being operable to communicate with the base station. The method comprises periodically transmitting essential system information "ESI" to the plurality of mobile terminals, the ESI comprising system information for using the cell provided by the base station; transmitting additional system information "ASI" to the mobile terminal, the ASI comprising system information for using one or more services provided by the cell wherein, in the event that it is determined that the base station is overloaded, the method further comprises transmitting a service notification that the cell is currently unable to provide the one or more services.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely illustrative embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

In the present disclosure, method steps discussed herein may be carried out in any suitable order and not necessarily in the order in which they are listed. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously (entirely or in part) or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered. For example transmitting a message may involve using several resource elements in an LTE environment such that several signals at a lower layer correspond to a single message at a higher layer. Also, transmissions from one terminal to another may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more of a mobile terminal, a base station or any other mobile unit may be configured accordingly if appropriate, so long as it is technically feasible and not explicitly excluded.

Whenever the expressions "greater than" or "smaller than" or equivalent are used herein, it is intended that they discloses both alternatives "and equal to" and "and not equal to" unless one alternative is expressly excluded or is not technically relevant.

It is noteworthy that even though the present disclosure has been discussed in the context of LTE and/or 5G, its teachings are applicable to but not limited to LTE, 5G or to other 3GPP standards. In particular, even though the terminology used herein is generally the same or similar to that of the 5G standards, the teachings are not limited to the present version of 5G and could apply equally to any appropriate arrangement not based on 5G and/or compliant with any other future version of an 5G or 3GPP or other standard.

Respective features of the present disclosure are defined by the following numbered examples:

Example 1. A method of transmitting system information in a mobile communications network, the network comprising a base station operable to provide a cell to communicate wirelessly with a plurality of mobile terminals and a mobile terminal of the plurality of mobile terminals, the mobile terminal being operable to communicate with the base station, the method comprising:

periodically transmitting essential system information "ESI" to the plurality of mobile terminals, the ESI comprising system information for using the cell provided by the base station;

transmitting additional system information "ASI" to the mobile terminal, the ASI comprising system information for using one or more services provided by the cell;

wherein, in the event that it is determined that the base station is overloaded, the method further comprises transmitting a service notification that the cell is currently unable to provide the one or more services.

Example 2. The method of Example 1 wherein the service notification is transmitted as part of the transmitted ASI.

Example 3. The method of Example 1 or 2 wherein the service notification is transmitted as part of the ESI.

Example 4. The method of Example 1 wherein the service notification is transmitted as part of the ESI and, in the event that it is determined that the base station is overloaded, the ASI is not transmitted to the mobile terminal.

Example 5. The method of Example 4 wherein the ESI comprises at least one field providing scheduling information for the ASI and wherein transmitting the service notification comprises transmitting the ESI with the at least one field not indicating any scheduling information for the ASI.

Example 6. The method of any of Example 4 or 5 wherein the ESI comprises an ASI notification indicating that the ASI is not transmitted.

Example 7. The method of any preceding Example wherein the ESI is transmitted by the base station.

Example 8. The method of any preceding Example wherein the ASI is transmitted by the base station or by a further base station different from the base station.

Example 9. The method of any preceding Example wherein the service notification is for one or more of:

notifying the mobile terminal that the cell is barring access to the one or more service and optionally to all services;

notifying the mobile terminal that another cell provided by another base station can provide the one or more service; and     notifying the mobile terminal that the cell is no longer campable.

Example 10. The method of Example 9 further comprising, upon notification that the cell is no longer campable, stopping the periodical transmission of the ESI.

Example 11. The method of any preceding Example wherein the ASI is transmitted to the mobile terminal periodically or upon request from the mobile request.

Example 12. A base station for transmitting system information in a mobile communications network, the base station being operable to provide a cell to communicate wirelessly with a plurality of mobile terminals, the base station being configured to:

periodically transmit essential system information "ESI" to the plurality of mobile terminals, the ESI comprising system information for using the cell provided by the base station;

transmit additional system information "ASI" to a mobile terminal of the plurality of mobile terminals, the ASI comprising system information for using one or more services provided by the cell; and     notify the mobile terminal, in the event that it is determined that the base station is overloaded, by causing transmission of a service notification that the cell is currently unable to provide the one or more services.

Example 13. The base station of Example 12 wherein the service notification is transmitted by a further base station different from the base station.

Example 14. The base station of Example 12 or 13 wherein the service notification is transmitted as part of the transmitted ASI.

Example 15. The base station of any of Examples 12 to 14 wherein the service notification is transmitted as part of the ESI.

Example 16. The base station of Example 12 or 13 wherein the service notification is transmitted as part of the ESI and wherein the base station is further configure not to transmit the ASI to the mobile terminal in the event that that it is determined that the base station is overloaded.

Example 17. The base station of Example 16 wherein the ESI comprises at least one field providing scheduling information for the ASI and wherein the base station being configured to transmit the service notification comprises the base station being configured to transmit the ESI with the at least one field not indicating any scheduling information for the ASI.

Example 18. The base station of Example 16 or 17 wherein the ESI comprises an ASI notification indicating that the ASI is not transmitted.

Example 19. The base station of any of Examples 12 to 18 wherein the service notification is for one or more of:

notifying the mobile terminal that the cell is barring access to the one or more service and optionally to all services;

notifying the mobile terminal that another cell provided by another base station can provide the one or more service; and     notifying the mobile terminal that the cell is no longer campable.

Example 20. The base station of Example 19 further configured to stop, upon notification that the cell is no longer campable, the periodical transmission of the ESI.

Example 21. The base station of any of Examples 12 to 20 wherein the base station is configured to:

transmit the ASI is transmitted to the mobile terminal periodically and/or     to transmit the ASI upon request from the mobile request.

Example 22. Circuitry for a base station for transmitting system information in a mobile communications network, wherein the circuitry comprises a controller element and a transceiver element configured to operate together to provide a cell to communicate wirelessly with a plurality of mobile terminals, and to:

periodically transmit essential system information "ESI" to the plurality of mobile terminals, the ESI comprising system information for using the cell provided by the base station;

transmit additional system information "ASI" to a mobile terminal of the plurality of mobile terminals, the ASI comprising system information for using one or more services provided by the cell; and     notify the mobile terminal, in the event that it is determined that the base station is overloaded, by causing transmission of a service notification that the cell is currently unable to provide the one or more services.

Example 23. A base station for transmitting system information in a mobile communications network, the base station being configured to carry out the method of any of Examples 1 to 11.

Example 24. A method of receiving system information in a mobile communications network, the network comprising a base station operable to provide a cell to communicate wirelessly with a plurality of mobile terminals and a mobile terminal of the plurality of mobile terminals, the mobile terminal being operable to communicate with the base station, the method comprising:

receiving essential system information "ESI" periodically transmitted to the plurality of mobile terminals, the ESI comprising system information for using the cell provided by the base station;

attempting to receive additional system information "ASI", the ASI comprising system information for using one or more services provided by the cell; and receiving a service notification that the cell is currently unable to provide the one or more services.

Example 25. The method of Example 24 further comprising receiving the ASI, wherein the service notification is received as part of the received ASI.

Example 26. The method of Example 25 wherein the ASI is received from the base station or from a further base station different from the base station.

Example 27. The method of any of Examples 24 to 26 wherein receiving the service notification comprises receiving the service notification as part of the ESI transmitted to the plurality of mobile terminals.

Example 28. The method of any of Examples 24 to 27 wherein the service notification is for one or more of:

notifying the mobile terminal that the cell is barring access to the one or more service and optionally to all services;

notifying the mobile terminal that another cell provided by another base station can provide the one or more service; and notifying the mobile terminal that the cell is no longer campable.

Example 29. The method of Example 28 wherein, upon notification that the cell is barring access to the one or more service, the method further comprises:

attempting to access at least one of the one or more services from a cell provided by a second base station different from the base station; and/or waiting for a time period before attempting again to receive the ASI.

Example 30. The method of Example 28 or 29 wherein, upon notification that cell is no longer campable, the method further comprises camping on a second cell provided by a second base station different from the base station.

Example 31. A mobile terminal for receiving system information in a mobile communications network, the network comprising a base station operable to provide a cell to communicate wirelessly with a plurality of mobile terminals, the mobile terminal being one of the plurality of mobile terminals wherein the mobile terminal is operable to communicate with the base station and is further operable to:

receive essential system information "ESI" periodically transmitted to the plurality of mobile terminals, the ESI comprising system information for using the cell provided by the base station;

attempt to receive additional system information "ASI", the ASI comprising system information for using one or more services provided by the cell; and receive a service notification that the cell is currently unable to provide the one or more services.

Example 32. The mobile terminal of Example 31 further configured to receive the ASI, wherein the service notification is received as part of the received ASI.

Example 33. The mobile terminal of Example 32 wherein the ASI is received from the base station or from a further base station different from the base station.

Example 34. The mobile terminal of any of Examples 31 to 33 wherein the mobile terminal being configured to receive the service notification comprises the mobile terminal being operable to receive the service notification as part of the ESI transmitted to the plurality of mobile terminals.

Example 35. The mobile terminal of any of Examples 31 to 34 wherein the service notification is for one or more of:

notifying the mobile terminal that the cell is barring access to the one or more service and optionally to all services;

notifying the mobile terminal that another cell provided by another base station can provide the one or more service; and notifying the mobile terminal that the cell is no longer campable.

Example 36. The mobile terminal of Example 35 wherein the mobile terminal is further operable to, upon notification that the cell is barring access to the one or more service:

attempt to access at least one of the one or more services from a cell provided by a second base station different from the base station; and/or wait for a time period before attempting again to receive the ASI.

Example 37. The mobile terminal of Example 35 or 36 wherein the mobile terminal is further operable to, upon notification that cell is no longer campable, camp on a second cell provided by a second base station different from the base station.

Example 38. Circuitry for mobile terminal for receiving system information in a mobile communications network, the network comprising a base station operable to provide a cell to communicate wirelessly with a plurality of mobile terminals, the mobile terminal being one of the plurality of mobile terminals wherein the circuitry comprises a controller element and a transceiver element configured to operate together to communicate with the base station and to:

receive essential system information "ESI" periodically transmitted to the plurality of mobile terminals, the ESI comprising system information for using the cell provided by the base station;

attempt to receive additional system information "ASI", the ASI comprising system information for using one or more services provided by the cell; and receive a service notification that the cell is currently unable to provide the one or more services.

Example 39. A mobile terminal for transmitting system information in a mobile communications network, the mobile terminal being configured to carry out the method of any of Examples 24-30.

REFERENCES

[1] Holma H. and Toskala A, "LTE for UMTS OFDMA and SC-FDMA based radio access", John Wiley and Sons, 2009

The invention claimed is:

1. A method of transmitting system information in a mobile communications network, the network comprising a base station operable to provide a cell to communicate wirelessly with a plurality of mobile terminals and a mobile terminal of the plurality of mobile terminals, the mobile terminal being operable to communicate with the base station, the method comprising:

periodically transmitting essential system information (ESI) to the plurality of mobile terminals, the ESI comprising system information for using the cell provided by the base station; and transmitting additional system information (ASI) to the mobile terminal, the ASI comprising system information for using one or more services provided by the cell, wherein in the event that it is determined that the cell is to be barred, the method further comprises transmitting a service notification that the cell is currently unable to provide the one or more services, wherein the service notification is for notifying the mobile terminal that the cell is no longer campable.

2. Circuitry for a base station for transmitting system information in a mobile communications network, wherein the circuitry comprises a controller and a transceiver configured to operate together to provide a cell to communicate wirelessly with a plurality of mobile terminals, and to:

periodically transmit essential system information (ESI) to the plurality of mobile terminals, the ESI comprising system information for using the cell provided by the base station; and transmit additional system information (ASI) to a mobile terminal of the plurality of mobile terminals, the ASI comprising system information for using one or more services provided by the cell; and notify the mobile terminal, in the event that it is determined that the cell is to be barred, by causing transmission of a service notification that the cell is currently unable to provide the one or more services, wherein the service notification is for notifying the mobile terminal that the cell is no longer campable.

3. The circuitry of claim 2, wherein
the service notification is transmitted as part of the transmitted ASI.

4. The circuitry of claim 2, wherein
the service notification is transmitted as part of the ESI.

5. The circuitry of claim 2, wherein
the service notification is transmitted as part of the ESI and, in the event that it is determined that the cell is to be barred, the ASI is not transmitted to the mobile terminal.

6. The circuitry of claim 5, wherein
the ESI comprises at least one field providing scheduling information for the ASI and wherein transmitting the service notification comprises transmitting the ESI with the at least one field not indicating any scheduling information for the ASI.

7. The circuitry of claim 5, wherein
the ESI comprises an ASI notification indicating that the ASI is not transmitted.

8. The circuitry of claim 2, wherein
the ASI is transmitted by a further base station different from the base station.

9. The circuitry of claim 2, wherein the service notification is for one or more of:
notifying the mobile terminal that the cell is barring access to the one or more service and optionally to all services;
notifying the mobile terminal that another cell provided by another base station can provide the one or more service; and
notifying the mobile terminal that the cell is no longer campable.

10. The circuitry of claim 2, wherein
the circuitry is configured to transmit the ASI to the mobile terminal periodically or upon request from the mobile request.

11. Circuitry for mobile terminal for receiving system information in a mobile communications network, the network comprising a base station operable to provide a cell to communicate wirelessly with a plurality of mobile terminals, the mobile terminal being one of the plurality of mobile terminals wherein the circuitry comprises a controller and a transceiver configured to operate together to communicate with the base station and to:

receive essential system information (ESI) periodically transmitted to the plurality of mobile terminals, the ESI comprising system information for using the cell provided by the base station;

attempt to receive additional system information (ASI), the ASI comprising system information for using one or more services provided by the cell; and receive a service notification that the cell is currently unable to provide the one or more services, wherein the service notification is for notifying the mobile terminal that the cell is no longer campable.

12. The circuitry of claim 11, wherein
the controller and a transceiver configured to operate together to receive the ASI, wherein the service notification is received as part of the received ASI.

13. The circuitry of claim 12, wherein
the ASI is received from the base station or from a further base station different from the base station.

14. The circuitry of claim 11, wherein
the mobile terminal is configured to receive the service notification as part of the ESI transmitted to the plurality of mobile terminals.

15. The circuitry of claim 11, wherein
the service notification is for notifying the mobile terminal that the cell is barring access to the one or more service and optionally to all services.

16. The circuitry of claim 15, wherein the circuitry is configured to, upon notification that the cell is barring access to the one or more service:
attempt to access at least one of the one or more services from a cell provided by a second base station different from the base station; and/or
wait for a time period before attempting again to receive the ASI.

17. The circuitry of claim 11, wherein
the service notification is for notifying the mobile terminal that another cell provided by another base station can provide the one or more service.

18. The circuitry of claim 11, wherein
the circuitry is configured to, upon notification that cell is no longer campable, camp on a second cell provided by a second base station different from the base station.

19. The circuitry of claim 11, wherein the circuitry is configured to:
stop periodical transmission of the ESI upon notification that the cell is no longer campable.

* * * * *